Aug. 29, 1933.                 C. M. PETERSEN                 1,924,750
                          SOCKET SHELL CONSTRUCTION
                          Filed Dec. 18, 1928         2 Sheets-Sheet 1
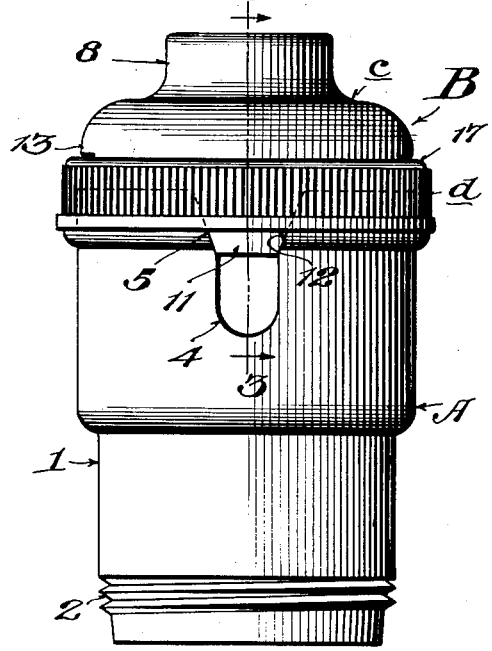
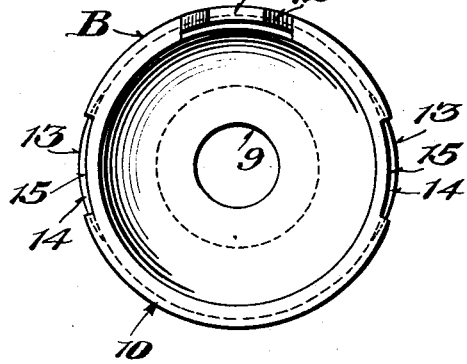
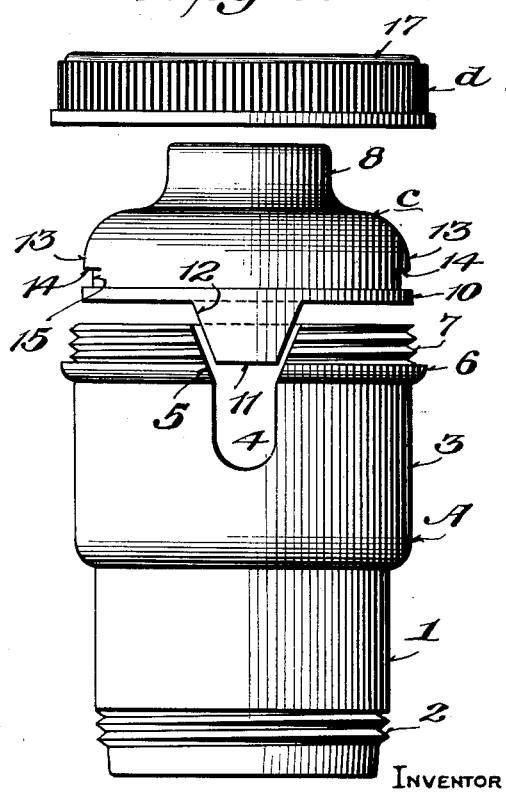
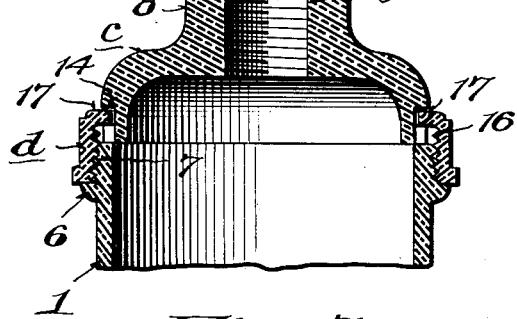
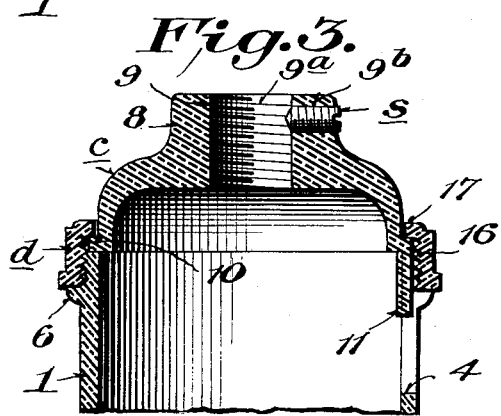
INVENTOR
Carl M. Petersen,
BY
ATTORNEY Aug. 29, 1933.   C. M. PETERSEN   1,924,750
SOCKET SHELL CONSTRUCTION
Filed Dec. 18, 1928   2 Sheets-Sheet 2

INVENTOR
Carl M. Petersen,

WITNESSES:-

ATTORNEY

Patented Aug. 29, 1933

1,924,750

UNITED STATES PATENT OFFICE 1,924,750

SOCKET SHELL CONSTRUCTION

Carl M. Petersen, Trenton, N. J., assignor to Circle F Mfg. Co., Trenton, N. J., a corporation of New Jersey Application December 18, 1928.
Serial No. 326,747

5 Claims. (Cl. 173—362)

This invention relates to improvements in electric lamp socket shells and more specifically to the structural features employed for interconnecting the various parts which form a complete shell.

An object of the invention is to provide a socket shell formed of a plurality of independent, molded parts which are separably interconnected by very simple structural formations whereby the shell will be exceedingly practical and economical to manufacture.

A further object of the invention is to provide a socket shell which preferably is formed of three separately molded parts, one constituting the body portion while the remaining two parts collectively constitute the cap portion. More specifically stated, the cap portion includes a cap proper and means for securing the same to the body portion.

A still further object of the invention is to provide the body portion and the cap portion with means for preventing relative angular movement while the securing means, which is movably and detachably assembled on the cap proper, is operated to connect the first mentioned parts.

With the above and other objects in view which will more readily appear as the nature of the invention is better understood, the same consists in the novel construction, combination and arrangement of parts herein more fully described, illustrated and claimed.

Preferred and practical embodiments of the invention are shown in the accompanying drawings in which:

Figure 1 is a side elevational view of one form of lamp socket shell embodying this invention.

Figure 2 is a detail vertical sectional view of the inner end portion of the shell disclosed in Fig. 1 and clearly illustrates the manner in which the various parts of the shell are interconnected.

Figure 3 is a similar view to Fig. 2 but taken upon line 3—3 of Fig. 1.

Figure 4 is a detail bottom plan view of the cap proper.

Figure 5 is a side elevational view disclosing the various parts of the socket shell arranged in the order in which they are assembled.

Figure 6:
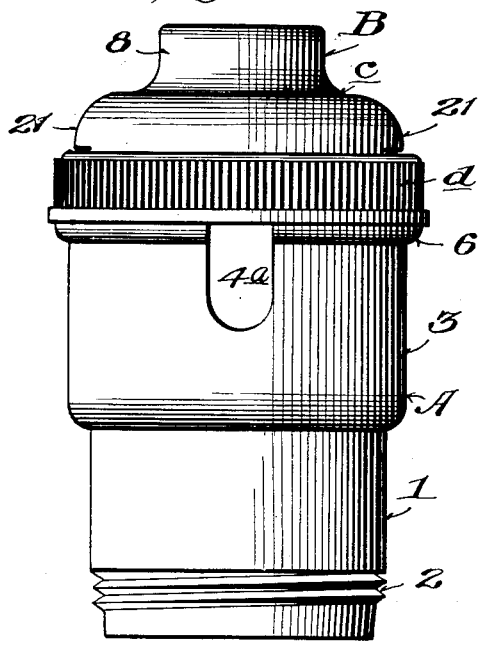
Figure 6 is a similar view to Fig. 1 but discloses a modified form of socket shell.

Electric lamp sockets now in general use or covered by Letters Patents generally are formed from thin sheet metal parts and the shells must be lined with insulating material. The shells usually consist of a body portion and a cap portion which are joined together by suitable latching means, complemental parts of which are formed upon the said portions. As has been stated above, the principal object of this invention is to provide a socket shell formed of independent parts which are molded from suitable insulating material, preferably bakelite. The molding of the parts from insulating material naturally relieves the necessity of providing an insulating lining for the shell. The various parts are separably connected by structural formations which are of exceedingly simple construction and which will enable the shells to be manufactured very economically.

While there have been illustrated two different forms of socket shells, it is to be understood that these shells differ from each other only in the form of means employed for preventing relative angular movement between the body portion of the shell and the cap proper during the assembling of said parts. Each form of cap includes a main body portion A to one end of which is detachably secured a cap portion B. Each cap portion includes a cap proper $c$ and a securing means $d$ employed for interconnecting the cap proper $c$ to the body portion A.

In the embodiment of the invention shown in Figs. 1 to 5, inclusive, the body portion A includes a reduced cylindrical part 1 exteriorly screw threaded at 2 for permitting a shade, or the like, to be detachably secured to the socket shell. This reduced cylindrical portion 1 usually houses the female connector portion to receive the mounting end of an electric light bulb. The body portion A further includes a cylindrical part 3 of greater diameter than the part 2 and which part 3 usually houses the circuit making and breaking mechanism for a socket. The part 3 is formed with a slot 4 provided for permitting the operator for the circuit making and breaking mechanism to pass through the shell so that the mechanism may be operated exteriorly of the shell. This slot 4 has outwardly diverging edge portions 5, the purpose of which will be disclosed at a later point. An annular flange 6 is formed on the end portion of the part 3 and between the end edge of this part and the flange 6, external screw threads 7 are provided.

The cap proper is molded with an attaching boss 8 by means of which the socket may be mounted upon a fixture or the like. The bore 9 of this boss is preferably screw threaded as indicated at 9a for attaching the socket to a fixture, and is also provided with the laterally extending screw threaded opening 9b for receiving a set screw $s$. The cap proper at its larger end is formed with an annular, radially outwardly extending flange 10 and from this flanged edge there depends a key 11 having converging side edges 12. This key 11 is of such length as to project below the nut $d$, thereby to be visible when the nut is assembled on the cap to enable quick assembly of the cap and shell. As shown in the drawings said key is adapted to be received within the flared end of the slot 4 for preventing relative angular movement between the body portion A and the cap proper $c$ during assembling of the socket shell. Preferably at diametrically opposite points, the enlarged end portion of the cap proper is formed with bulges 13 providing shoulders 14. These shoulders 14 cooperate with the opposed side face of the flange 10 for providing a guideway for the clamping means $d$ in a manner to be described at a later point. The flange 10 is cut away at its outer edge, as at 15, directly opposite the shoulders 14.

The clamping means $d$ has the form of a clamping nut internally screw threaded at 16 for engagement with the threads 7 formed on the main body portion A. The clamping nut further is provided with an annular inwardly directed radial flange 17 at its upper edge. This flange 17 is intended to be positioned within the guideway formed between the flange 10 and the shoulders 14, on the cap proper by telescopically springing the flanged portion 17 of the clamping nut over the bulges 13. It will be seen that when the clamping nut is assembled upon the cap proper $c$, the nut may be freely rotated with respect to the said cap.

In assembling the socket shell illustrated in Figs. 1 to 5, inclusive, the clamping nut $d$ is mounted upon the cap proper $c$ by telescopically springing the flange 17 over the bulges 13. The cap proper then is positioned with respect to the body portion A so that the key 11 is located within the flared end portion of the slot 4. The key 11 and the end portion of the slot will act as latching means for preventing relative angular movement between the cap and the body. The clamping nut then may be rotated with respect to the cap proper and the body portion A for threading the clamping nut upon the threaded portion 7 of the body.

Figure 8:
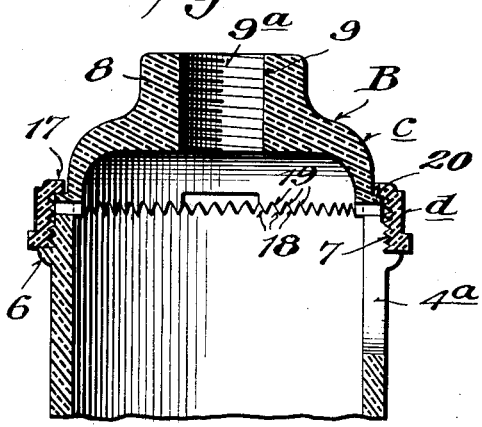
Figure 8 is a similar view to Fig. 7 but taken at right angles thereto.
Figure 7:
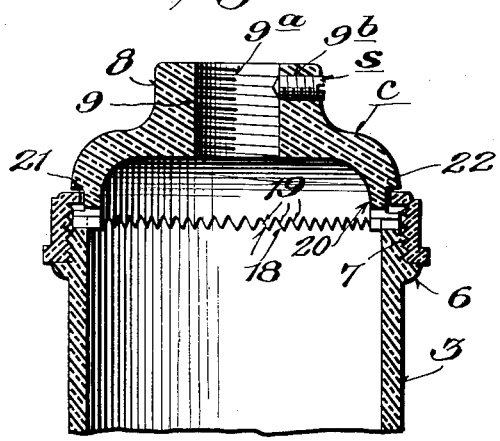
Figure 7 is a detail vertical sectional view of the inner end portion of the socket shell disclosed in Fig. 6.
Figure 9:
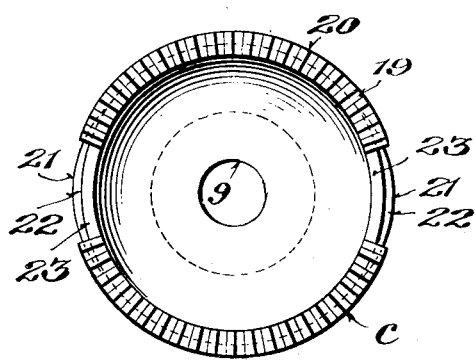
Figure 9 is a detail bottom plan view of the cap proper employed in the socket shell disclosed in Figs. 6, 7, and 8.

In the form of socket shell disclosed in Figs. 6 to 9, inclusive, the body portion A is substantially the same as the body portion A disclosed in Figs. 1 to 5, inclusive, and for this reason similarly formed parts will be given the same reference characters as employed in connection with the socket shell disclosed in these previous figures.

The slot 4a in the socket shell now being described is not provided with the flared outer end portion as clearly illustrated in Fig. 5. The edge of the body portion is serrated at 18 forming one part of a latch connection provided between the body portion A and the cap portion B. These serrations 18 function in the same manner as the single flared end portion 5 of the slot 4, as disclosed in the previous described figures.

The cap proper $c$ is formed with serrations 19 adapted to mate with the serrations 18 formed on the edge of the body part A. These serrations 19 are formed in the bottom face of an annular flange 20 provided on the edge portion of the cap proper. At diametrically opposed points, the body portion of the cap is provided with bulged parts 21 forming shoulders 22 which cooperate with the opposed face of the flange for providing a guideway similar to that described in connection with the form of socket shell disclosed in Figs. 1 to 5, inclusive. The flange 20 and serrations 19 are entirely omitted at 23, or opposite the bulged portions 21.

The clamping nut $d$ is formed with a radially inwardly extending flange 17 which is adapted to be sprung over the bulged portions 21 of the cap $c$ to locate the flange 17 in the guideway formed between the shoulders 22 and the opposed face of the flange 20 thereby permitting the clamping nut $d$ to be angularly adjusted with respect to the cap $c$.

In assembling the form of socket shell illustrated in Figs. 6 to 9, inclusive, the clamping nut is positioned upon the cap proper and then the cap portion B is positioned with respect to the end of the body portion A so that the serrations 18 and 19 will register or mesh. By rotating the clamping nut $d$, the cap portion and body portion will be assembled.

Without further description, it is thought that the features and advantages of the invention will be readily apparent to those skilled in the art and it will of course be understood that changes in the form, proportion and minor details of construction may be resorted to without departing from the spirit of the invention and scope of the appended claims.

I claim:

1. A socket shell comprising a body portion, a cap element, and a nut element for securing the cap element to the body portion, one of said elements having a flange and the other having a groove to receive said flange to effect a swivel connection between said elements, the nut element being flexible and being adapted to be deformed and sprung over the cap element to effect interengagement of said tongue with said groove.

2. A socket shell comprising a body portion, a cap element, and a nut element for securing the cap element to the body portion, said cap and nut elements having integral formations, respectively, interengageable to effect a swivel connection between said elements, the nut element being flexible and being adapted to be deformed and sprung over the cap element to effect interengagement of said formations.

3. A socket shell comprising a body portion, a cap, and a nut for securing the cap to the body portion, an outwardly directed flange at the inner end of the cap, a projection on the outer face of the cap spaced from said flange to provide a groove, and an inwardly directed flange on the nut for engagement in said groove to effect a swivel connection between the nut and the cap, the nut being flexible and being adapted to be deformed and sprung over said projection to effect engagement of the flange of the nut in the groove of the cap.

4. A socket shell comprising a body portion, a cap having nut retaining means, means for preventing relative angular movement between the cap and body portion during assembly, and a clamping nut for separably connecting said cap and body portion, said clamping nut being carried by the cap and assembled thereto by the act of springing the nut over the retaining means.

5. A molding socket shell comprising a body portion, a cap having nut retaining means, interlocking means molded in the engaging edges of the cap and body portion for preventing relative angular movement during assembly, and a clamping nut for separably connecting said cap and body portion, said clamping nut being carried by the cap and assembled thereto by the act of springing the nut over the retaining means.

CARL M. PETERSEN.